MOISTURE CONTENT MEASURING DEVICE INCLUDING CAPACITOR ELECTRODES DIFFERING IN SIZE
Filed Jan. 15, 1965
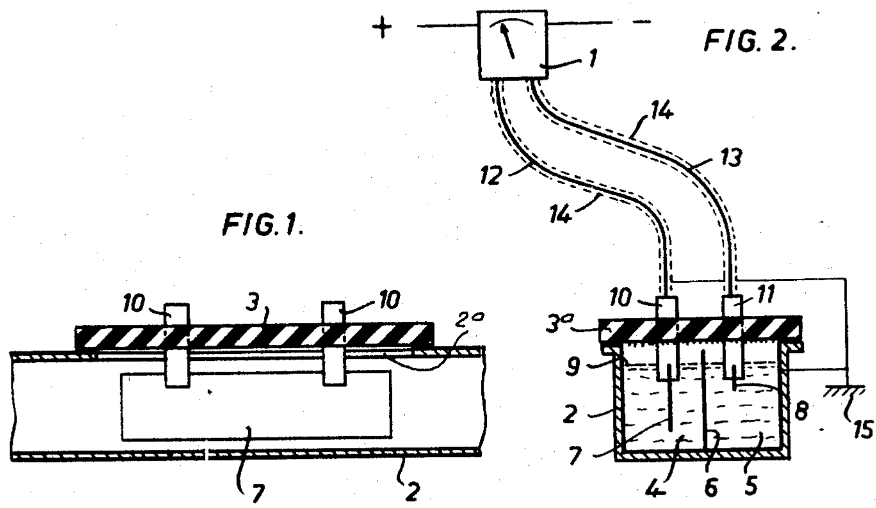
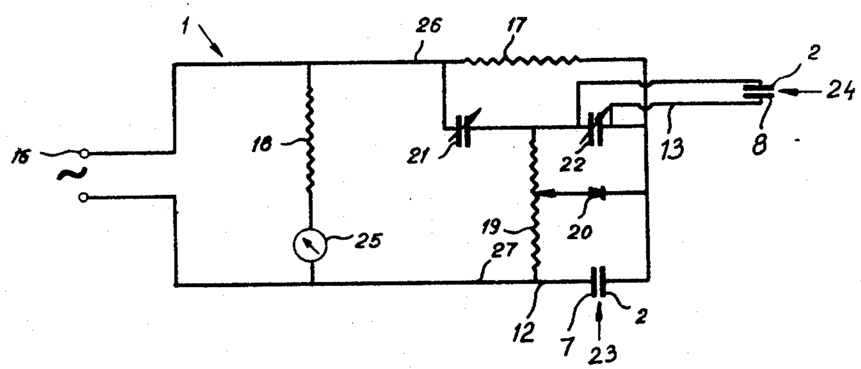
INVENTOR.
Vilgot Raymond Nilsson
BY
Davis, Hoxie, Faithfull & Hapgood
Attorneys United States Patent Office 3,394,307

Patented July 23, 1968

3,394,307

MOISTURE CONTENT MEASURING DEVICE INCLUDING CAPACITOR ELECTRODES DIFFERING IN SIZE

Vilgot Raymond Nilsson, Hagersten, Sweden, assignor to Alfa-Laval AB, Tumba, Sweden, a corporation of Sweden Filed Jan. 15, 1965, Ser. No. 425,813
Claims priority, application Sweden, Feb. 1, 1964, 1,262/64
4 Claims. (Cl. 324—61)

ABSTRACT OF THE DISCLOSURE

A measuring condenser and a compensating condenser have a common condenser element contacting a stream of the material of which the moisture content is to be determined, each condenser including a second element contacting the stream in spaced relation to the common element. These second elements are connected to substantially identical attachment means and contact the stream over respective areas which are of the same dimension in one direction, but the contacting area of the second element of the measuring condenser is substantially greater than that of the second element of the compensating condenser. Variations in the difference between the capacitances of the two condensers are indicated by a measuring instrument including a bridge-like circuit in which the two condensers are so connected that moisture deposits on the attachment means for the respective condensers have counteracting effects, thereby avoiding spurious indications by the measuring instrument.

The present invention relates to devices for determining the water content of materials fed through a pipe or other closed duct. The invention has particular reference to devices for this purpose which operate according to the capacitive measuring method and utilize an insulated or uninsulated emitter, whereby a change of the water content will be directly proportional to the change of the strength of the measuring current.

In such measurements it is of great importance that the water be equally distributed in the material. However, in certain materials, such as butter, the water has a tendency to issue (perspire) and form a moisture film between the attachment of the emitter and the pipe. This causes a varying resistance of the emitter and incorrect measuring values.

The invention has for its object to prevent this disadvantage.

According to the invention, the emitter is provided with a compensating body which has the same attachment as the measuring body of the emitter to the pipe but which is substantially influenced only by moisture within that range where the moisture distorts the measuring value. In this case, the measuring body and the compensating body are connected to parts, having reverse symbols, of a bridge-like circuit of the measuring instrument, and consequently the compensating body will compensate the errors of the measuring values due to moisture which has the same possibility of influencing the compensating body as the measuring body.

Other features of the invention appear from the following description with reference to the accompanying drawings, in which:

FIG. 1 is a longitudinal sectional view of a duct provided with a capacitor plate as in a conventional emitter for measuring the water content of materials;

FIG. 2 is a cross-sectional view of a duct provided with an emitter having a compensating body according to the present invention; and FIG. 3 is a wiring diagram illustrating an embodiment of the present invention.

Referring to FIG. 1, the moisture-containing material, such as butter, is fed through a pipe or duct 2 having a top opening 2*a* normally closed by a cover plate 3 of insulating material. Within the duct below cover 3 is a metal plate 7 extending lengthwise of the duct in spaced relation to the duct walls and serving as a condenser plate. This plate is secured to the insulating cover 3 by bolt-like holders 10 extending through the cover. The plate 7 and duct 2 form a condenser which is connected into a conventional electrical instrument for measuring changes in the capacitance of the condenser, these changes being a measure of changes in the water content of the material fed through the duct 2. As previously mentioned, a difficulty with this prior system is that water issuing from the fed material (such as butter) forms a moisture film on the plate holders 10, the lower face of cover 3 and the duct walls; and these water deposits affect the capacitance of the condensers 2 and 7 as measured by the electrical instrument, so that the measured values are not truly representative of the moisture content of the fed material.

Referring now to the new device as shown in FIG. 2, the interior of duct 2, along the portion underlying the cover 3*a*, is divided into two parallel chambers 4 and 5 by a longitudinal and vertical partition 6, the chambers 4 and 5 being of the same size and shape. The partition 6 extends from the bottom of duct 2 to a level above the normal level 9 of the material fed through duct 2, but the upper edge of the partition is spaced below the insulating cover 3. The plate 7 of the measuring condenser is located in chamber 4, where it is supported by the metal holders 10 passing upward through insulating cover 3*a*; and the plate 7 extends downward almost to the bottom of duct 2.

Within the other chamber 5 is a compensating plate 8 extending lengthwise of the chamber and parallel to measuring plate 7. The plates 7 and 8 are of the same length and are located within the same length range of duct 2. However, the compensating plate 8 extends only slightly below the normal level 9 of the fed material, so that its lower edge is well above the lower edge of measuring plate 7. The compensating plate 8 is connected to the insulating cover 3*a* in exactly the same manner as the measuring plate 7, by metal holders 11 identical to, but spaced transversely of the holders 10.

It will be understood that plate 7 and the opposing walls of chamber 4 form a measuring condenser, and the plate 8 and opposing walls of chamber 5 form a compensating condenser.

The measuring instrument is shown schematically at 1 in FIG. 2 and includes a conventional bridge-like circuit (hereinafter referred to as a "bridge") having a positive part and negative part. The measuring and compensating condensers are connected, respectively, to these parts of the bridge having opposite polarity. As shown, the holders 10 of measuring plate 7 are electrically connected by a screened line 12 to a positive part of the bridge of instrument 1, and the holders 11 of compensating plate 8 are similarly connected by a screened line 13 to a negative part of the bridge. The duct 2 and the screens 14 of the lines 12 and 13 are grounded, as shown at 15. Thus, each condenser is inserted in the corresponding part of the bridge circuit through the line 12 or 13 and a connection to the grounded duct 2.

In the assumed case where butter is fed through duct 2, the moisture separating ("perspiring") from the butter will deposit on the attachments of the perspective plates 7 and 8, that is, along the walls of the duct and on the underside of cover 3*a* and around the holders 10 and 11. However, these moisture deposits will affect the respective attachments in the same manner electrically. Thus, the compensating plate 8 will completely counterbalance the effect of the moisture deposit on the values measured by the instrument 1. Whatever effect the moisture deposit may have on the condenser including measuring plate 7, it will have a similar effect on the compensating condenser including plate 8, and these similar effects act in a reverse direction on measuring instrument 1. Consequently, the instrument 1 will indicate only those measuring values resulting from penetration of the measuring plate 7 into the compact mass of butter.

Referring to FIG. 3, which illustrates an example of the measuring instrument 1, the reference numeral 16 designates an alternating current generator, for example, one generating a current at 10 kilocycles. The circuit as shown is provided with two throttling or choke coils 17 and 18, a trimming or variable resistance coil 19, a rectifier 20, a trimming or variable condenser 21, and a variable condenser 22 by means of which the measuring value of the device is calibrated (adjusted on zero) for a certain water content of the butter or the like. The circuit also includes the measuring condenser 23 formed by plate 7 and duct 2, the compensating condenser 24 formed by plate 8 and duct 2, a current indicator 25, and lines 26 and 27.

In operation, a loading current flows between the zero adjustment condenser 22 and the measuring condenser 23. At a measuring value increasing from zero (increasing current strength), the loading current via the condenser 23 will be larger than the loading current via the condenser 22 and forms a measuring current, which is equal to the loading current via the condenser 23 reduced by the loading current via the condenser 22 and which is indicated by the current indicator 25. The measuring current, the passage of which is blocked in the one direction through the rectifier 20, flows via the throttling coil 17, the line 26, the throttling coil 18, the current indicator 25 and the line 27 to the trimming coil 19. Because the means for attachment of the measuring condenser 23 and the compensating condenser 24 at the measuring plate 2 of the same nature, the measuring errors, which occur due to the attachments of condensers, will be equal and will thus automatically compensate each other. Thus, the current indicator 25 will give a true quantitative indication of changes in the moisture content of the butter as it passes through chambers 4 and 5, it being understood that such changes will vary the capacitance of measuring condenser 23 and thus the reading of the current indicator 25.

While reference has been made to butter as the material fed through duct 2, it will be apparent that the new device may be used for measuring the moisture content of other materials.

I claim:

1. In combination with a duct for feeding a moisture-containing material and having confining walls, a device for determining the moisture content of said material which comprises a measuring plate positioned in said duct to penetrate substantially below the surface layer of said materials, a compensating plate positioned in said duct to penetrate only into the surface layer of said material, said plates extending longitudinally along the same length of the duct in spaced relation to each other and to the duct walls, substantially identical attachment means mounting the respective plates in the duct, said plates forming with the duct a measuring condenser and a compensating condenser, respectively, and a measuring instrument including an electrical bridge-like circuit having points of opposite polarity in which the respective condensers are connected, said instrument also including means for indicating variations in the difference between the capacitances of the measuring and compensating condensers, whereby the effect on said indicating means of moisture deposits on the measuring plate attachment means is substantially counteracted by the effect on said indicating means of moisture deposits on the compensating plate attachment means.

2. The combination according to claim 1, comprising also a partition dividing said duct into two longitudinal passages containing the respective plates, said passages being of equal size and shape.

3. The combination according to claim 2, in which said bridge-like circuit includes adjustable means for calibrating the circuit to a predetermined moisture content of said material.

4. In a device for determining the moisture content of a stream of moisture-containing material, the combination of a measuring condenser and a compensating condenser having a common condenser element contacting said stream, each condenser including a second element contacting the stream in spaced relation to said common element, said second elements of the respective condensers contacting the stream over the respective areas which are of the same dimension in one direction, said contacting area of the second element of the measuring condenser being substantially greater than said contacting area of the second element of the compensating condenser, substantially identical attachment means connected to said second elements of the respective condensers for mounting said elements, and a measuring instrument including an electrical bridge-like circuit having points of opposite polarity in which the respective condensers are connected, said instrument also including means for indicating variations in the difference between the capacitances of the measuring and compensating condensers, whereby the effect on said indicating means of moisture deposits on said attachment means for the measuring condenser is substantially counteracted by the effect on said indicating means of moisture deposits on said attachment means for the compensating condenser.

References Cited

UNITED STATES PATENTS

| | | | |
|---|---|---|---|
| 2,485,579 | 10/1949 | Elliott | 324—61 |
| 3,037,165 | 5/1962 | Kerr | 324—61 |
| 3,273,058 | 9/1966 | Prellwitz | 324—61 |

FOREIGN PATENTS

| | | |
|---|---|---|
| 126,582 | 3/1959 | U.S.S.R. |

RUDOLPH V. ROLINEC, *Primary Examiner.*

E. E. KUBASIEWICZ, *Assistant Examiner.*